United States Patent [19]

Mathews

[11] Patent Number: 4,735,653

[45] Date of Patent: Apr. 5, 1988

[54] PROCESS FOR THE DIRECT REDUCTION OF SULPHUROUS IRON ORES

[75] Inventor: Waldemar Mathews, Bergheim, Fed. Rep. of Germany

[73] Assignee: Korf Engineering GmbH, Dusseldorf, Fed. Rep. of Germany

[21] Appl. No.: 753,416

[22] Filed: Jul. 10, 1985

[30] Foreign Application Priority Data

Aug. 28, 1984 [DE] Fed. Rep. of Germany ....... 3432090

[51] Int. Cl.$^4$ ............................................. C21B 13/02
[52] U.S. Cl. ........................................ 75/35; 266/156
[58] Field of Search ...................... 75/34, 35; 266/156

[56] References Cited

U.S. PATENT DOCUMENTS 4,032,120 6/1977 Beggs ................................ 266/159
4,087,275 5/1978 Beggs ................................... 75/35

Primary Examiner—Melvyn J. Andrews

[57] ABSTRACT

An apparatus for the direct reduction of sulphurous iron ores with a shaft furnace, in which the ore is reduced in counterflow to the reducing gas is described, the waste gas being subdivided into two streams following the furnace. One stream heats and desulphurizes the ore located above the shaft furnace in an ore bunker and is then supplied to the gas converter for heating purposes. The other stream, together with hydrocarbons, is supplied to a catalytic gas converter for producing reducing gas. The ore bunker is positioned above the shaft furnace and the ore outlet of the ore bunker is connected via downcomers with the ore inlet of the shaft furnace.

6 Claims, 1 Drawing Sheet

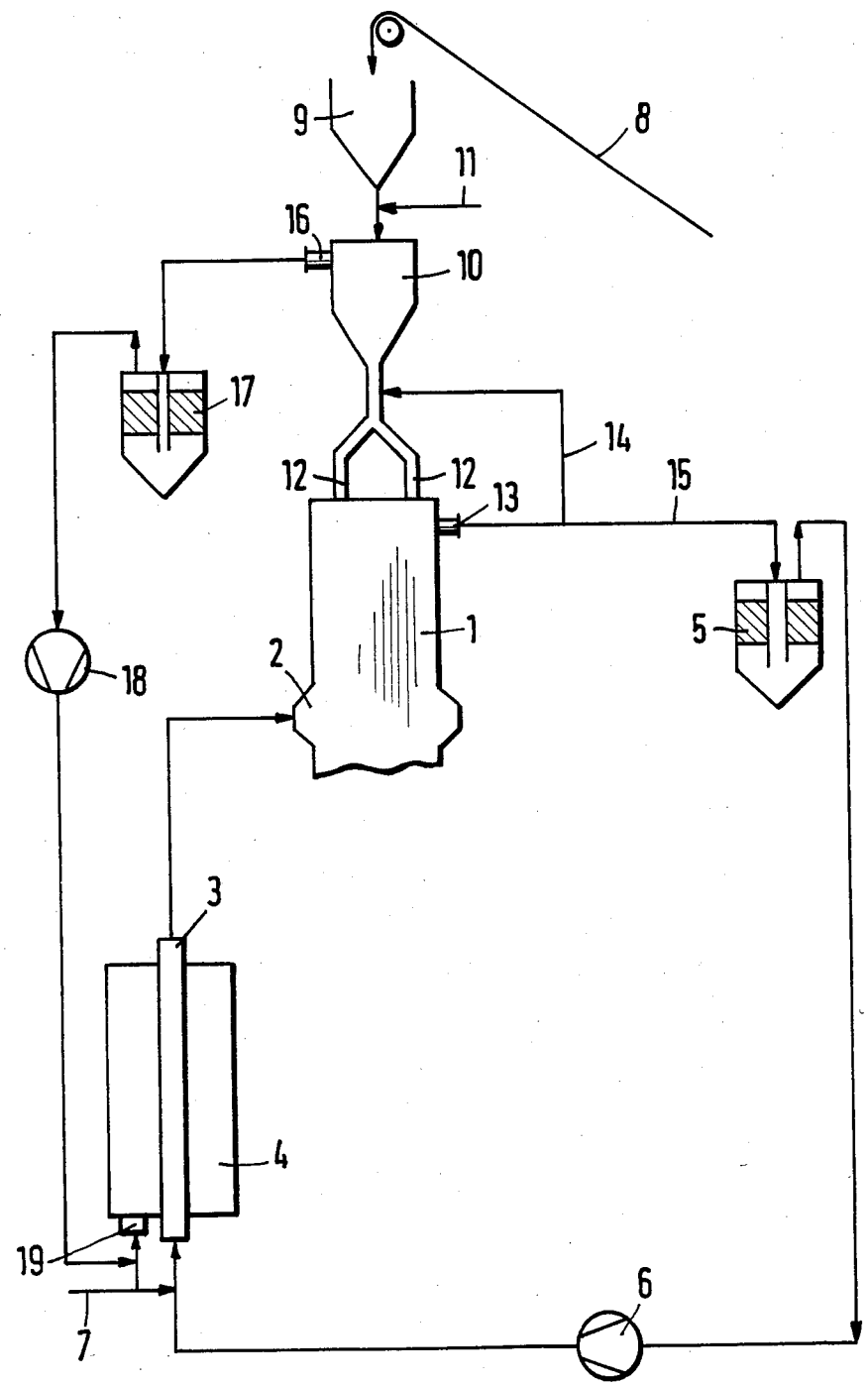

PROCESS FOR THE DIRECT REDUCTION OF SULPHUROUS IRON ORES

The present invention relates to a process for the direct reduction of sulphurous iron ores within a shaft furnace, in which the ore is reduced in counter-current flow with the reducing gas, as well as to an apparatus for performing this process.

Such an apparatus is known from U.S. Pat. No. 4,032,120. This apparatus makes use of the fact that the direct reduction of iron oxide ($Fe_2O_3$) into iron in a shaft furnace takes approximately 3½ to 4½ hours, whereas the desulphurization of iron ore, accompanied by the formation of hydrogen sulphide in the reducing gas is ended approximately 30 to 40 minutes after introducing the iron ore into the shaft furnace. This means that only the ore in the upper part of the shaft furnace supplies sulphur in the form of hydrogen sulphides to the waste gas, whereas the waste gas in the lower part of the shaft furnace is free from sulphur.

If sulphur-containing waste gas is fed into the reducing gas converter, in order to be converted with the aid of a catalyst into a reducing gas together with a hydrocarbon compound, then there is a risk of the catalyst being poisoned by the sulphur, so that the action of the catalyst is considerably reduced. Thus, in the known process, the waste gas is subdivided into two partial flows within the shaft furnace, before the enrichment of the waste gas with hydrogen sulphide takes place. This subdivision takes place roughly in the centre between the inlet height for the reducing gas and the inlet height for the sulphur-rich iron ore. One partial hot waste gas flow is passed further upwards through the iron ore, so that the latter is desulphurized and also partly reduced. The consequently greatly sulphur-enriched waste gas is removed from the shaft furnace at the level of the iron ore inlet and is used, after cleaning and compression, as a heating gas for heating the converter. The other partial waste gas flow is removed from the shaft furnace at the subdivision point. As at this level desulphurization of the iron ore has already been completed, said this partial flow is substantially free from sulphur. Thus, after cleaning and compression, it is mixed with a hydrocarbon compound and is fed with the latter into the converter, where the gaseous mixture is converted with the aid of a catalyst into the reducing gas. There is no risk of catalyst poisoning, because the waste gas used for the conversion does not contain sulphur.

However, the known apparatus suffers from the disadvantage that a considerable portion of the hot waste gas is removed at a relatively low level from the shaft furnace and is consequently lost for the reduction work, whilst in the upper part of the furnace the iron ore is not adequately heated. Thus, there is only an inadequate ore desulphurization and in this area the ore is also not reduced to the desired extent.

In addition, the known apparatus suffers from the disadvantage that the sensible heat of the waste gas is not utilised and is instead transferred and wasted in a direct condenser leading to the sewage disposal system.

The object of the present invention is therefore to provide a process for the direct reduction of sulphurous iron ores of the aforementioned type, in which an improved desulphurization of the iron ore by waste gas is obtained, before the ore comes into contact with the waste gas used for conversion into reducing gas. Furthermore, a more effective reduction of the iron ore is to be brought about by a more advantageous preheating, as well as a better heat utilization of the waste gas from the shaft furnace.

According to the invention this problem is solved in that following the shaft furnace, the waste gas is subdivided into two streams, whereof the first stream preheats and desulphurizes the ore located in an ore bunker above the shaft furnace and is then this first stream used for heating purposes and the second, together with the hydrocarbons, is passed to a catalytic gas converter for the purpose of producing reducing gas.

The quantity ratio of the first to the second waste gas stream is preferably approximately 1:2. The first waste gas stream is passed into the ore bunker preferably has a temperature of approximately 700° C. The first waste gas stream leaving the bunker can be used for heating the gas converter, it being charged with hydrogen sulphide and having a temperature of approximately 200° C. The ore bunker is preferably supplied with ore by a collecting bunker. The ore bunker is under a shaft furnace gas pressure and the collecting bunker is open to the atmosphere.

An advantageous development of an apparatus for performing the present process comprises the ore bunker positioned above the shaft furnace and the ore outlet of the ore bunker is connected via downcomers gravity chutes with the ore inlet of the shaft furnace. In addition, the ore bunker outlet for the sulphurous waste gas is preferably connected to the heating gas inlet of the gas converter, so that in this way use is made of the heating energy contained in the waste gas. For the preparation of the two waste gas streams for use in the gas converter, a scrubber and a compressor are advantageously provided in the corresponding feed lines.

The energy saving in the present process is approximately 0.1 Gcal/t of reduced ore, as a result of the better utilization of the waste gas.

The invention is described in greater detail hereinafter relative to an embodiment shown in the drawing. The drawing diagramatically shows the invention with relevant parts of an apparatus for the direct reduction of sulphurous iron ores.

In the drawing, 1 is that part of a shaft furnace for the direct reduction of iron ores above an inlet 2 for the reducing gas. The reducing gas is produced in a catalyst-containing pipe 3 of a gas converter 4. For this purpose, the lower inlet of pipe 3 is supplied with a mixture of waste or spent gas with a low sulphur content, which has been cleaned in a scrubber 5 and compressed in a compressor 6, together with a reducing hydrocarbon-containing compound fed in via a line 7, eg. natural gas. By means of a line 11, inert gas is blown into the connection between ore container 9 and ore bunker 10, to prevent the escape of sulphurous waste gas from the ore bunker 10 via said connection. The iron ore desulphurized and preheated in ore bunker 10 in a manner to be described hereinafter passes via downcomers 12 into shaft furnace 1.

A waste gas outlet 13 is provided at the upper end of the shaft furnace. The line carrying the waste gas splits behind outlet 13 into two lines 14 15, roughly a third of the waste gas being passed as the first partial stream via line 14 into the lower part of ore bunker 10 and the remainder is passed as a second partial stream via line 15. Line 15 passes via scrubber 5 and compressor 6 to the lower inlet of pipe 3 of converter 4. The reducing gas fed into shaft furnace 1 via inlet 2 has a temperature of approximately 880° C. and the waste gas removed via outlet 13 and fed via line 14 into ore bunker 10 has a temperature of approximately 700° C. The first stream rises in ore bunker 10 and brings about a preheating, as well as almost complete desulphurization of the iron ore contained therein by converting the sulphide sulphur content into hydrogen sulphide. The ore fed into the ore bunker 10 at a temperature of approximately 25° C. and a moisture content of approximately 2% has at the outlet of said bunker into the chutes a temperature of approximately 450° C. and a moisture content of approximately 0%. Within shaft furnace 1, the desulfurized ore is heated by the reducing gas to a temperature of approximately 820° C. level of reducing gas inlet 2. The sulphurous waste gas leaving the bunker has a temperature of approximately 100° to 200° C. and is drawn off via an outlet 16 at the upper end of the ore bunker and is supplied via a scrubber 17 and a compressor 18 to a heating gas inlet 19 of converter 4. Additional heating gas can be supplied to said inlet 19, eg. natural gas supplied via line 7.

I claim:

1. A process for the direct reduction of sulphurous iron ores, comprising: feeding said sulphurous iron ores into an ore bunker arranged above and separate from a shaft furnace; preheating and de-sulphurizing said sulphurous iron ores in said ore bunker; feeding the de-sulphurized iron ores into said shaft furnace and directly reducing the same therein with a reducing gas in counterflow manner; dividing spent reducing gas from said shaft furnace into a first and a second spent reducing gas stream; feeding said first stream into said ore bunker for pre-heating and de-sulphurizing the sulphurous iron ores; feeding said second spent reducing gas stream together with hydrocarbons through a catalyst tube of a catalytic reducing gas converter for producing said reducing gas, and feeding the reducing gas into said shaft furnace; and feeding said first stream from said iron ore bunker to said catalytic gas converter for heating said reducing gas in said catalyst tube.

2. The process according to claim 1, wherein the quantity ratio of the first spent reducing gasgas stream to the second spent reducing gas stream is approximately 1 to 2.

3. The process according to claim 1, wherein the first spent reducing gas stream fed into said iron ore bunker has a temperature of approximately 700° C.

4. The process according to claim 1 or 2, wherein the iron ore in said ore bunker is heated by said first spent reducing gas stream to a temperature of approximately 450° C.

5. The process according to claim 1, wherein the ore bunker is supplied with ore from a collecting bunker at atmospheric pressure, said ore bunker and said shaft furnace being at a same pressure.

6. The process according to claim 1, wherein the temperature of the first spent reducing gas stream leaving said iron ore bunker is 100° to 200° C.

* * * * *